Dec. 14, 1926.

F. J. BOSTOCK ET AL

METHOD OF GENERATING WORM THREADS

Filed July 28, 1924

1,610,995

Inventors:
Francis J. Bostock, and
Swinfen Bramley-Moore
by Herbert W. P. Jenner
Attorney.

Patented Dec. 14, 1926.

1,610,995

UNITED STATES PATENT OFFICE.

FRANCIS JOHN BOSTOCK AND SWINFEN BRAMLEY-MOORE, OF HUDDERSFIELD, ENGLAND.

METHOD OF GENERATING WORM THREADS.

Application filed July 28, 1924, Serial No. 728,730, and in Great Britain September 21, 1923.

This invention relates to a method or manner of producing the hour-glass, globoidal or Hindley type of worm gear and also worm gear made in accordance with our pending application for patent Serial No. 672,736, filed Nov. 5, 1923 (now Patent No. 1,553,666, dated September 15, 1925), and the invention has for its object the obtainment of a novel and improved method of generating or forming the thread or threads of the worm or the shape thereof.

A further object is to so operate the cutting medium in relation to the worm blank and in coordination with the rotation of the worm blank as to form the side or sides of the worm thread or threads in a novel and also practical and efficacious manner, in order to expedite manufacture and produce a worm of advantageous formation such as disclosed in the above-mentioned application.

With the foregoing and other objects in view, which will be apparent as the invention is more fully understood, the invention resides in the method or process as hereinafter described and claimed, it being understood that changes can be made within the scope of what is claimed without departing from the spirit of the invention.

The invention is illustrated in the accompanying drawing, wherein—

Figure 1:
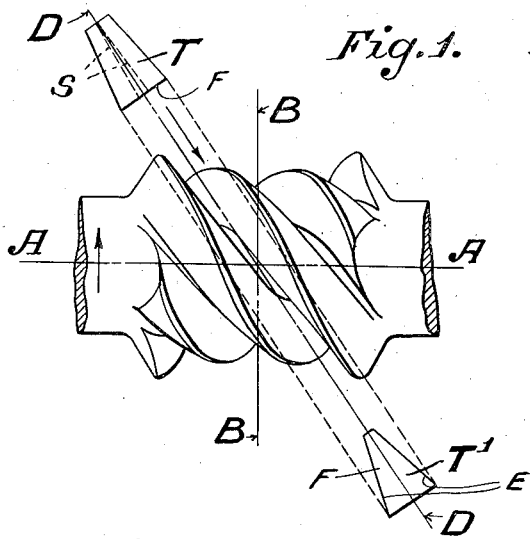
Figure 1 is a side elevation of the worm blank showing the cutter in starting position above the worm and, in dotted lines, the path of movement of the cutter, and giving a face view of the cutter below the worm.
Figure 2:
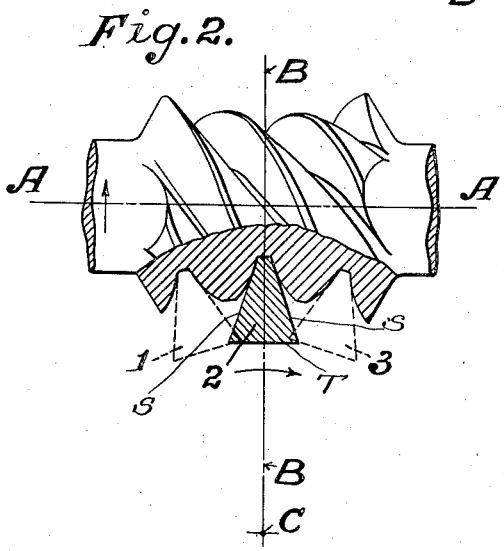
Fig. 2 is a section of the worm and cutter with the cutter in cutting position, portions of the worm being shown in elevation, and other positions of the cutter being shown in dotted lines.
Figure 3:
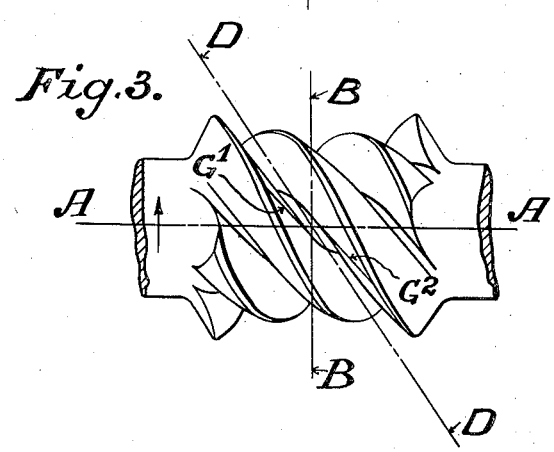
Fig. 3 is an elevation of the worm blank with the cutter omitted.

As shown in Figs. 1, 2 and 3, the line A—A is the axis of the worm blank, and B—B is a plane at right angles to the axis or line A—A in which is disposed the axis C (Fig. 2) of the worm wheel (not shown) which is conjugate to the worm produced in accordance with the present invention. It is preferable to use, as hereinafter described, an axis C coinciding with the axis of the worm wheel as indicated, although in some instances the axis may be displaced with reference to the worm wheel axis. However, for purpose of illustration the axis C in Fig. 2 may be selected which is also the axis of the worm wheel conjugate to the worm, and the axis C in Figs. 1 and 3 is above the lines B—B in said Figs. 1 and 3.

Figure 4:
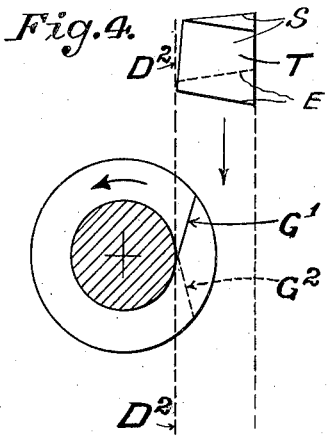
Fig. 4 is a diagrammatical end view of the worm blank showing the cutter and, in dotted lines, the line of movement of the cutter with reference to the worm blank.

A cutter, grinding wheel or other cutting medium may be used, but a straight-edged or straight-sided cutter is advantageously used. As shown in Figs. 1, 2 and 4 the tool comprises a cutter T having the face F and the converging sides S, with the cutting edges E between said face and sides. The cutting edges and sides are straight or substantially so, and the sides converge rearwardly from the face F, and also in a direction toward the worm blank axis. The cutter is shown in its starting position above the worm in Fig. 1, and a face view of the cutter is shown below the worm in said Fig. 1.

In carrying out the process the cutter or tool T is moved along a rectilinear path or straight line D—D (Fig. 1) obliquely of the axis C in the direction of the arrow. The cutter or tool has a compound movement. Thus, in addition to the movement of the cutter across the worm blank obliquely with reference to the axis C, the cutter is also moved around the center or axis C in coordination with the turning movement of the worm blank. Thus, as the cutter moves along the rectilinear or straight line D—D in the direction of the arrow in Fig. 1, the worm blank is turned in the direction of the arrow in Fig. 1, and the cutter or tool is made to simultaneously turn around the center or axis C, with the movements of the worm blank and cutter coordinated to correspond to the movements of the completed worm and worm wheel. Reference being had to Fig. 2, the cutter or tool T is moving obliquely toward the right away from the observer across the blank and the lower portion of the worm blank is moving toward the observer, and at the same time the tool is moved toward the right around the center or axis C as indicated by the positions 1, 2 and 3. The cutter or tool therefore moves between the convolutions of the thread or threads obliquely across the worm blank. The line or path of movement of the cutter is oblique with reference to both the worm axis A—A and the worm wheel or the selected axis C, to correspond with the helical form of the worm thread or threads. The cutter or tool can be moved along the line D—D of Fig. 1 without the turning of the worm blank around its axis or the turning movement of the cutter or tool around the center or axis C, but the use of such turning movements enables a continuous operation to be employed instead of an intermittent or step by step operation. The movement of the cutter across the worm blank obtains the tangential cutting of the sides of the worm threads by the straight-edged or straight-sided cutter. The movement of the cutter obliquely of the worm blank is along a straight line $D^2$—$D^2$, as seen in Fig. 4, but during such straight-line movement of the cutter across the worm blank the cutter also moves around the axis C in coordination with the rotation of the worm blank. Fig. 4 illustrates the straight line of movement of the cutter, and as the cutter moves in between two convolutions of the worm threads one cutting edge E will cut the adjacent side of the corresponding convolution along the tangential line $G^1$ (Figs. 3 and 4), and as the cutter moves from between the convolutions of the worm threads the other cutting edge E will cut the corresponding side of the other convolution along the line $G^2$ (Figs. 3 and 4). The lines $G^1$, $G^2$, etc., are tangential with reference to the circles defining the bases of the worm threads, it being understood that the body of the worm or worm blank is of the hour-glass type and increases in cross-section from its intermediate portion to its ends. In one passage of the cutter between two convolutions of the worm threads two cuts are made along lines $G^1$ and $G^2$ in succession, and this operation is repeated until both sides of the worm threads have been completely cut or generated. This may be accomplished by reciprocating the cutter or tool or returning same for repeated operation intermittently, or a series of cutters may be provided to operate on the worm blank one after the other in succession. Thus, as the worm blank is rotated the cutter or cutters will by movement across the worm blank, cut and define the sides of the worm threads, and the simultaneous rotation of the worm blank and movement of the cutter or cutters around the axis C in the direction of the arrow in Fig. 2 will give the worm blank the hour-glass or globoidal form.

As seen in Fig. 2, the sides of the worm threads are convexed in radial planes in which the worm axis is disposed, this being due to the sides of the threads having been formed or given their requisite shape by the tangential cutting of the cutting medium along the lines $G^1$ and $G^2$. The sides of the threads thus diverge from the sides of cutter or tool, as seen in Fig. 2. The sides of the threads are defined by innumerable lines $G^1$ and $G^2$ throughout the length of the threads.

Figure 5:
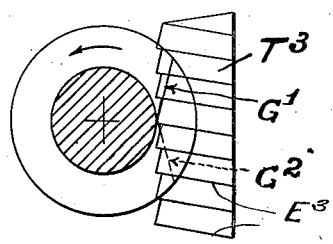
Fig. 5 is a diagrammatical end view of the worm blank illustrating a multiple edged cutter having a series of cutting edges to act in succession on the worm blank.

As suggested in Fig. 5, the tool or cutter $T^3$ may be a multiple cutter, having a series of cutting edges $E^3$ to operate on the sides of the worm threads in succession with a continuous non-reciprocatory movement. Such a tool is in fact a series of cutters united to operate one after the other, each performing as a single cutter on the worm blank.

Figure 6:
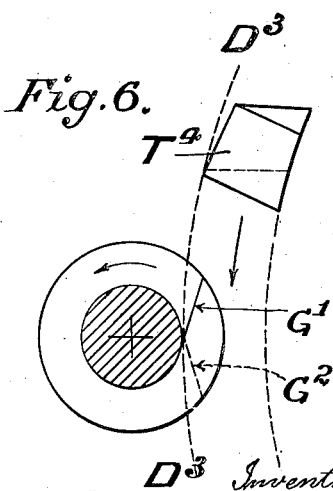
Fig. 6 is an end view of the worm blank, corresponding with Fig. 4, and illustrating a modification wherein the cutter moves in a curved path instead of a straight line as in Fig. 4.

Fig. 6 illustrates the movement of the tool or cutter $T^4$ along the curved line or path $D^3$—$D^3$ of large radius obliquely of the worm blank whereby the curvilinear path of movement of the cutter approximates the rectilinear or straight line movement hereinbefore described, the tangential lines of the cuts $G^1$ and $G^2$ being substantially the same as obtained in Figs. 3 and 4. It is thus possible to mount the cutter or tool for movement around two different centers or axes, one the center or axis C and the other a center or axis spaced away from the worm axis in order that the movement of the tool or cutter across the worm blank will nearly approximate a straight line movement while the cutter is operating on the worm blank. Thus, by having the radius of the curved line $D^3$—$D^3$ relatively long, it is possible to have the cutter or tool mounted for movement about the two axes, and the arc of movement of the cutter when engaging the worm blank is so small with reference to the circle that the movement of the cutter transversely of the worm blank is approximately along a straight line.

The line of movement $D^3$—$D^3$ in Fig. 6 may be an arc of a circle, as above indicated, or may be an arc of a helix, inasmuch as the tool may move either in a circular or in a helical path with the movement of the tool while engaging the blank substantially along a straight line or so near to a straight line as to accomplish the desired results.

It is also to be understood that the motions of the parts are relative. Thus, the worm blank has been described as rotating about its axis, and it will be apparent that, although probably not so convenient, the worm blank may be non-rotatable and the cutter or cutting medium may be rotated around the worm blank axis in cooperation with its other movements relatively to the blank. Or, the cutter may be stationary and the worm blank may be given the several movements relatively to the cutter.

Having thus described the invention, what is claimed as new is:—

1. The method of generating the thread of a globoidal worm consisting in the movement of a substantially straight-sided cutting medium across a worm blank along a substantially straight line obliquely of a selected axis disposed angularly relatively to and spaced from the axis of said worm blank, and in the simultaneous movement of the cutting medium around said selected axis in coordination with the rotation of the worm blank around its axis.

2. The method of generating the thread of a globoidal worm consisting in the movement of a substantially straight-sided cutting medium across a worm blank along a substantially straight line obliquely with reference to the corresponding worm wheel axis, and in the simultaneous movement of the cutting medium around said worm wheel axis in coordination with the rotation of said worm blank around its axis.

3. The method of generating the thread of a globoidal worm consisting in the movement of a cutting medium across a worm blank, to cut the side or sides of the thread, along lines tangential to circles defining the base of the thread, and the simultaneous turning movement of the cutting medium about a selected axis in coordination with the rotation of the worm blank about its axis.

4. The method of generating the thread of a globoidal worm consisting in the movement of a straight-sided cutting medium across a worm blank along substantially straight lines defining the side or sides of the thread and tangential to circles defining the base of the thread, and the simultaneous turning movement of the cutting medium about a selected axis in coordination with the rotation of the worm blank about its axis.

In testimony whereof we affix our signatures.

FRANCIS JOHN BOSTOCK.
SWINFEN BRAMLEY-MOORE.